March 18, 1958 E. G. KESLING 2,827,012
APPLICATOR FOR LIQUID CEMENT
Filed April 18, 1955
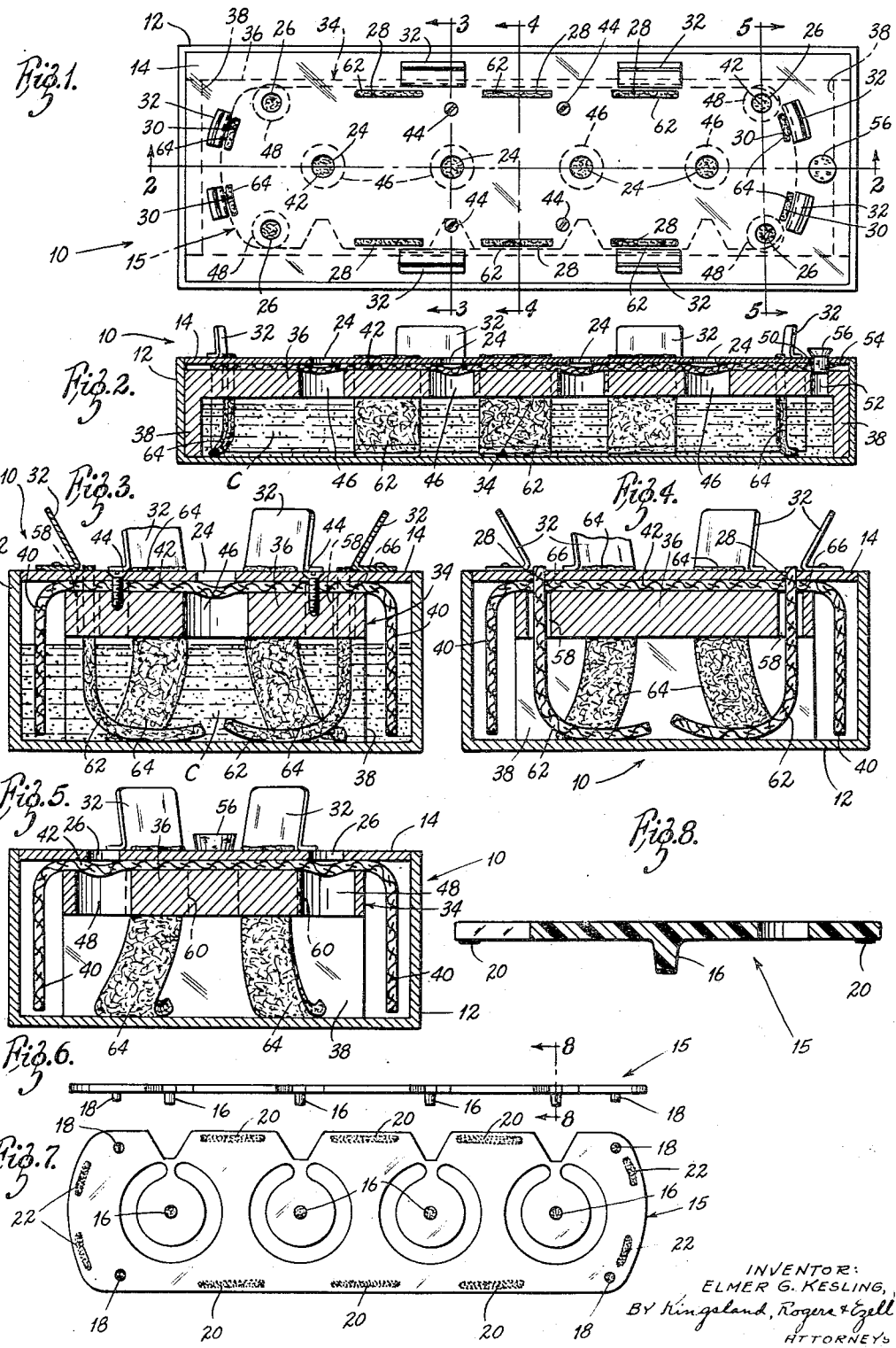
INVENTOR:
ELMER G. KESLING,
BY Kingsland, Rogers & Ezell
ATTORNEYS

United States Patent Office 2,827,012
Patented Mar. 18, 1958

2,827,012

APPLICATOR FOR LIQUID CEMENT

Elmer G. Kesling, Richmond Heights, Mo.

Application April 18, 1955, Serial No. 502,035

3 Claims. (Cl. 118—268)

The present invention relates generally to applicators, and more particularly to a novel device for applying liquid cement in a predetermined pattern on the surface of a plastic article.

The increasing use of plastics as a base material for numerous articles of manufacture is, of course, due in large part to the facility with which plastic parts may be mass produced. In many instances, plastic parts are joined together in the construction of plastic articles, and the method of securement generally resorted to involves the application of liquid cement to at least one of the parts and then pressing the parts together. Not infrequently, it is desired to apply the liquid cement in narrow strips or in small spots, and there are many occasions when it is desired to apply the cement to as many as a dozen or more different spots on the same article. Obviously, manual application of the cement by brush or syringe in such cases is time-consuming and inefficient. Thus, it is a general object of the present invention to provide a novel applicator for applying liquid cement in a predetermined pattern on a plastic article.

One convenient method of applying liquid cement involves the use of a fibrous device, such as a wick, or the like, for absorbing a quantity of cement for subsequent direct transfer to an article to be cemented. The cementing fluid of the exposed transfer edge eventually becomes contaminated with the substance to which the cement is applied which reduces the cementing quality of the cement, thus reducing the efficiency of transfer. It is a more specific object of the present invention, therefore, to provide a novel applicator for applying liquid cement which utilizes a fibrous tape wick and which includes holding means which enables the wick being pulled up slightly and trimmed at will for providing a fresh applying edge.

It is another object of the present invention to provide a novel liquid cement applicator which incorporates a reservoir for containing a quantity of the cement.

It is another object of the invention to provide a novel applicator for applying liquid cement in a predetermined pattern which utilizes a fibrous wick for withdrawing the cement from the reservoir and applying it to the part to be cemented.

It is another object of the invention to provide a novel applicator for applying liquid cement in a predetermined pattern which utilizes a single wick for applying cement in a plurality of spots.

The foregoing, along with additional objects and advantages, will be apparent from the following description taken in conjunction with the accompanying drawing, in which:

Figure 1 is a top plan view of an applicator conforming to the present invention;

Figure 2 is a vertical sectional view taken generally along the line 2—2 of Figure 1 and showing the applicator with a quantity of liquid cement therein;

Figure 3 is an enlarged vertical section taken generally along the line 3—3 of Figure 1 and showing the applicator with a quantity of liquid cement therein;

Figure 4 is an enlarged vertical sectional view taken generally along the line 4—4 of Figure 1;

Figure 5 is an enlarged vertical sectional view taken generally along the line 5—5 of Figure 1;

Figure 6 is a side elevational view of a plastic cover for a calculator, the illustrated cover being typical of plastic parts to which liquid cement is to be applied in a predetermined pattern;

Figure 7 is a bottom plan view of the cover of Figure 6, showing liquid cement applied thereto; and Figure 8 is an enlarged vertical sectional view taken generally along the line 8—8 of Figure 6 and showing liquid cement applied to the cover.

Referring to the drawing more particularly by means of reference characters, the numeral 10 designates generally an applicator constructed in accordance with the teachings of the present invention. The applicator 10 includes a shallow rectangular box 12, provided with a plate-like cover 14 which fits snugly within the box 12, as clearly illustrated in Figures 2 and 3. Both the box 12 and the cover 14 may be constructed of metal, or any other material which will not be dissolved or corroded by the liquid cement to be used therewith.

The illustrated applicator 10 is a production tool, and, hence, is adapted for use with a particular plastic article to which cement is to be applied. For illustrative purposes only, therefore, there is shown in Figures 6, 7 and 8 an article of plastic manufacture for which the illustrated applicator 10 is adapted to apply cement in a predetermined pattern. The plastic article, designated by the numeral 15, while generally plate-like in form, has four depending pintles 16 and four integral locating pins 18. It is desired that liquid cement be applied, not only to the free ends of each of the pintles 16 and pins 18, but also in the form of six side strips 20 and four end strips 22. Returning now to the applicator 10, the cover plate 14 is, as best shown in Figure 1, provided with a plurality of openings which correspond substantially in size, shape and relative location with the desired pattern of cement to be applied to the article 15. Thus, there are four holes 24 of a size and location for easy accommodation of the pintles 16; there are four holes 26 of a size and location for easy accommodation of the locating pins 18; and there are six slots 28 and four slots 30 corresponding in size and location with the desired cement patches 20 and 22, respectively.

In addition to being provided with the above enumerated openings corresponding to the desired application of cement to the article 15, the cover plate 14 has mounted thereon a plurality of guide brackets or clips 32 shaped as clearly illustrated in Figures 3 and 4 and secured by means of rivets, welding, or the like, in the pattern best illustrated in Figure 1. Thus disposed, the clips 32 serve as positioning guides for an article 15 emplaced as indicated by the broken outline of Figure 1.

A table or platform 34, comprising a top panel 36 supported by end panels 38, is removably disposed within the box-like reservoir 12, as clearly illustrated in Figures 2 and 4. It will be noted that the table 34, while having substantially the same length as the reservoir 12, is somewhat narrower than the latter so as to leave ample room on each side for depending side portions 40 of a blanket wick 42. This wick 42 extends over the top of the table 34 so as to be interposed between the cover 14 and the panel 36 of the table 34. Thus assembled, the cover 14, the wick 42, and the panel 36 of the table 34 are fastened together by means of countersunk screws 44 which pass through the cover 14 and wick 42 for threaded engagement with the panel 36.

As clearly illustrated in each of the Figures 1 through 5, the panel 36 of the table 34 is provided with vertical holes which are in respective axial alignment with the holes previously mentioned as being formed in the cover plate 14. It will be particularly noted, however, that each of the holes in the panel 36 is of substantially greater diameter than the hole with which it is aligned. Thus, a hole 46 of greater diameter than the holes 24 aligns with each of the latter, and a hole 48 of greater diameter than the holes 26 aligns with each of the latter. Despite this aligned arrangement of the holes 24, 26, 46, and 48, however, it will be observed from Figures 2, 3, and 5 that the blanket wick 42 is not perforated at these points, but extends solidly across these openings.

It may be mentioned at this point that, in addition to the holes above-mentioned, the cover plate 14 is provided with a filler hole 50 in alignment with a hole 52 formed in the panel 36, and also with a hole 54 formed in the blanket wick 42. A cork 56 is provided for closing this filler opening.

As best illustrated in Figures 3 and 4, the panel 36, in addition to being provided with the round openings above-mentioned, is also provided with slotted openings in alignment with the slots 28 and 30 in the cover plate 14. These openings, designated 58 and 60, corresponding respectively with the slots 28 and 30, are also somewhat larger than their counterparts in the cover plate 14, so as to provide free traverse for strip wicks 62 and 64 which extend upwardly through the appropriate slots to project just above the upper surface of the cover plate 14, as illustrated in the sectional views of the drawing. As indicated in Figure 4, narrow slits 66 are provided in the blanket wick 42 for passage of the strip wicks 62 and 64 therethrough. The arrangement is clearly such that the individual strip wicks 62 and 64 may be drawn upwardly through their respective slots 28 and 30 and trimmed off as often as necessary to maintain an efficient applying edge.

In use, the applicator 10 will be provided with liquid cement, designated generally as C in Figures 2 and 3, which may be introduced through the aforementioned filler opening 52, the latter being then closed by means of the cork 56. The liquid cement in the reservoir 12 will, of course, saturate the lower ends of each of the strip wicks 62 and 64, and also the depending portions 40 of the blanket wick 42. The liquid cement will rise by capillary action until the whole of these wicks are in saturated condition. With the applicator 10 thus prepared, it is only necessary to dispose an article 15 within the guide clips 32 and to press it downwardly toward the cover plate 14 in order to apply cement in the desired pattern thereon. The depending pintles 16 and pins 18 engage the blanket wick 42 at the same time the body portion of the article 15 engages the projecting portions of the strip wicks 62 and 64.

Liquid cement may be applied by means of the applicator pin to one after another article 15, inasmuch as the several wicks therein will serve to provide a continuous supply of cement at the points of application.

Preferably, the applicator 10 is frequently emptied and cleaned thoroughly, this being a simple operation due to the above-described construction which permits the whole applicator assembly to be lifted right out of the reservoir 12 without the necessity of dismantling the several parts. The blanket wick is easily replaced when necessary, while the strip wicks 62 and 64 may be pulled up slightly and trimmed with shears, or the like, as often as necessary to keep the applying edges in good condition.

Clearly, there has been described an applicator which fulfills the objects and advantages sought therefor.

The foregoing description and the accompanying drawing have been given only by way of illustration and example. It is to be understood, therefore, that changes in the form of the elements, rearrangement of parts, and the substitution of equivalent elements, all of which will be apparent to those skilled in the art, are contemplated as being within the scope of the present invention, which is limited only by the claims which follow.

What is claimed is:

1. An applicator for liquid cement comprising, in combination, a reservoir for containing a quantity of liquid cement, a flat cover for said reservoir, said cover being provided with openings therethrough spaced in a predetermined pattern, a plate disposed below said cover and parallel therewith, said plate being provided with an opening in alignment with an opening in the cover, and wick means in said reservoir, said wick means including a fibrous blanket interposed between the cover and the plate and extending at least substantially to the bottom of the reservoir, said blanket having a slit therein in alignment with the aligned holes in the cover and the plate, said wick means further including a strip wick extending through said aligned openings including said slit so as to project above the upper surface of the cover.

2. An applicator for liquid cement comprising, in combination, a reservoir for containing a quantity of liquid cement, a flat cover for said reservoir, said cover being provided with openings therethrough spaced in a predetermined pattern, a support disposed in the reservoir beneath the cover and having a flat upper surface parallel to the latter, said support having openings which correspond to the openings in the cover, a blanket wick disposed with a portion between the support and the cover and with the remainder hanging over the side of the support, said blanket wick having slits therein corresponding to at least some of the holes in the cover, and a plurality of strip wicks extending upwardly through said slits and through selected openings in the support and cover.

3. The applicator of claim 2 wherein the blanket wick is provided with openings for accommodation of said strip wicks, said openings being in alignment with aligned openings in the cover and the support and formed for close-fitting engagement between the blanket wick and the strip wicks.

References Cited in the file of this patent

UNITED STATES PATENTS

| 740,233 | Clark | Sept. 29, 1903 |
| 1,099,979 | Holt | June 16, 1914 |
| 2,340,204 | Pike | Jan. 25, 1944 |
| 2,678,023 | Bachman | May 11, 1954 |

FOREIGN PATENTS

| 17,712 | Great Britain | of 1893 |